United States Patent
Hoeldrich et al.

(10) Patent No.: US 10,059,155 B2
(45) Date of Patent: Aug. 28, 2018

(54) METHOD OF INFLATING AND DEFLATING A TYRE

(71) Applicant: AGCO International GmbH, Hesston, KS (US)

(72) Inventors: Bernhard Hoeldrich, Marktoberdorf (DE); Frank Kreulich, Marktoberdorf (DE); Alexander Staedele, Landsberg am Lech (DE)

(73) Assignee: AGCO International GmbH, Neuhausen (CH)

( * ) Notice: Subject to any disclaimer, the term of this patent is extended or adjusted under 35 U.S.C. 154(b) by 57 days.

(21) Appl. No.: 14/915,477

(22) PCT Filed: Jun. 26, 2014

(86) PCT No.: PCT/EP2014/063570
§ 371 (c)(1),
(2) Date: Feb. 29, 2016

(87) PCT Pub. No.: WO2015/028170
PCT Pub. Date: Mar. 5, 2015

(65) Prior Publication Data
US 2016/0200151 A1  Jul. 14, 2016

(30) Foreign Application Priority Data
Aug. 29, 2013 (GB) .................................. 1315393.7

(51) Int. Cl.
*B60C 23/00* (2006.01)

(52) U.S. Cl.
CPC .................................. *B60C 23/003* (2013.01)

(58) Field of Classification Search
CPC .................................................... B60C 23/003
USPC ....................................................... 152/417
See application file for complete search history.

(56) References Cited

U.S. PATENT DOCUMENTS

| | | | | |
|---|---|---|---|---|
| 4,431,043 A * | 2/1984 | Goodell | ................ | B60C 23/001 137/224 |
| 5,147,494 A * | 9/1992 | Torii | ..................... | B60C 23/003 156/417 |
| 6,575,269 B1 * | 6/2003 | Skoff | .................... | B60C 23/003 152/416 |
| 9,352,622 B2 * | 5/2016 | Tigges | .................. | B60C 23/003 |
| 2006/0231184 A1 * | 10/2006 | Beverly | ............... | B60C 23/003 152/417 |
| 2009/0084481 A1 * | 4/2009 | Kalavitz | ............... | B60C 23/003 152/417 |
| 2014/0062031 A1 * | 3/2014 | Honzek | ................. | B60C 23/003 277/551 |

* cited by examiner

*Primary Examiner* — Kip T Kotter

(57) ABSTRACT

A method of inflating and deflating a tire on a vehicle, said vehicle having a rotatable air passage connectable to a tire and a non rotatable air passage through which air is conducted from a pressurized air supply. One of the passages has an associated sealing means for co-operating with a contact component associated with the other passage and wherein prior to inflation and deflation of the tire, one of the passages is pressurized to ensure the integrity of the sealing means with the contact component.

12 Claims, 5 Drawing Sheets

METHOD OF INFLATING AND DEFLATING A TYRE

BACKGROUND OF THE INVENTION

Field of Invention

This invention relates to a tyre pressure control system (TPCS) having a rotatable air passage. In particular this invention relates to a tyre pressure control system with a rotatable air passage on an agricultural vehicle or machine.

Description of Related Art

In order to improve efficiency and safety of an agricultural machine, or an agricultural vehicle such as an agricultural tractor, it Is necessary to change the pressure of the tyres depending on whether the tractor is operating, or on the road. When operating in the field, lower tyre pressures are required to reduce ground pressure and compaction and to improve the grip of the tyres with the earth. For road work, higher tyre pressures are required to reduce rolling resistance (which affects the efficiency of the tractor) and to reduce heat generation (which affects the safety of the tractor). The pressures of the tyres may typically be varied by 0.6 bar-2.5 bar when moving between field and road surfaces.

Generally, a tyre inflation and deflation system comprises at least one rotatable air passage which is provided on, or within an axle to carry air to and from the tyres. The rotatable passage may be connected to a further air duct for carrying air. The rotatable passage extends between rigid, stationary parts (which are connected to the vehicle frame, or form a part of the frame, for example an axle housing) and rotating parts (for example, the wheel hubs). Rotating parts such as wheel hubs are equipped with shaft seals to prevent oil from entering the air guiding area of the rotatable passage. Such systems are described in the Applicant's previous UK patent application Nos. GB1021928.5 and GB1021931.9.

Air seals are used to seal the rotatable shaft which comprises the rotatable passage with a non rotatable part of the vehicle comprising a non rotatable passage. The non rotatable part may be the shaft housing In which the shaft and rotatable passage are housed. The rotatable passage is connected to air intake and air out take lines which are connected to an air source. To reduce the wear of the air seals, the sealing lips of the air seals only come into contact with a contact surface of the shaft when the rotatable air passage is charged with air during inflation or deflation. When the rotatable passage is not charged with air, the lips of the air seals are lifted away from the contact surface.

Problems arise in the rotatable passage if the air seals malfunction as it is then possible for air to flow through the shaft seals and impair their sealing function. A peak in air pressure may lift the shaft seals from their contacting surface so that air can pass into the axle housing. This results in a higher pressure level in oil guiding areas which may result in the following consequences:

- Debris or dust may be brought in the oil guiding areas via leaked air.
- Seals or bearings may be damaged as lubricating oil is blown out resulting in higher wear.
- Other seals installed in the vicinity of these oil guiding areas may be lifted and result in further oil leakage.

Damaged shaft seals result in oil entering the air guiding area and in combination with dust may led to blocked ducts and malfunction.

OVERVIEW OF THE INVENTION

To overcome these problems, further passages or chambers may be provided as suggested in the Applicant's previous UK patent application Nos. GB 1021929.3, GB1116851.5 and GB1118156.7 which are hereby incorporated by reference. In these applications, chambers are connected to the air seals which are connected to ambient pressure, or a pressurisation means to control the sealing contact of the air seals with the contact surface. The chambers discharge any air that has leaked to avoid damage to the shaft seals.

With the aforementioned arrangements, the tyre pressure is measured by a pressure meter which measures the pressure in the rotatable passage. However, these arrangements do not offer a reliable means of measuring the tyre pressure during inflation, or deflation since the pressure level in the rotatable passage cannot always be accurately measured by the pressure meter and the pressure is not always sufficiently high to ensure proper sealing contact of the shaft seals. This results from the fact that the tyre volume is relatively large on agricultural vehicles and machines compared to the volumes supplied by the air supply system, so that air passes with high velocity but at a low pressure level (approximately 0.4 to 3 bar).

Furthermore, the tyre pressure is typically increased or decreased on an agricultural tractor, or agricultural machine as the vehicle, or machine moves over different types of terrain in the fields, or moves onto prepared road surfaces. The required range of tyre pressures makes it difficult to set the air seals to operate at specific pressures. As a consequence, a good sealing contact between rotatable and non rotatable parts of the air pressurisation arrangement cannot be guaranteed every time which results in the aforementioned problems.

U.S. Pat. No. 4,804,027 discloses the use of a check valve located in a passage on a non rotatable part between the hub and the axle housing so that the seals may be pressurised against the contact surface of the rotatable part until a specific pressure is met. A check valve then permits the flow of pressurised air into a passage in the rotatable part. The use of the check valve between the hub and axle housing requires complex structuring of vertical supports either side of each control valve in the passage of the rotatable part. Further, the use of a check valve means the seals can only provide a good seal over the full range of tyre pressures tor the flow of air in one direction through the arrangement. This means the arrangement can only be used during inflation or deflation of the tyre, but not for both.

It is an object of the current invention to provide an alternative method to improve the seal of a sealing means acting between a ratable passage of a rotatable part and a non rotatable passage of a non rotatable part of a vehicle by pressurising the rotatable passage prior to both inflation and deflation of a tyre.

According to the invention, there is provided a method of inflating and deflating a tyre on a vehicle, said vehicle having a rotatable air passage connectable to a tyre, said vehicle having a non rotatable air passage through which air is conducted from a pressurised air supply, one of the passages having an associated sealing means for co-operating with a contact component associated with the other passage and wherein prior to inflation and deflation of the tyre, one of the passages is pressurised to ensure the integrity of the sealing means with the contact component.

Preferably, the non rotatable air passage is provided with sealing means.

The rotatable passage may be located within an axle shaft and the non rotatable shaft may be an axle housing or trumpet housing.

The method ensures that a seal between the rotatable and non rotatable passages is secure before inflation and deflation of the tyre begins. This means that the shaft seals are firmly held in contact with a contact surface of the shaft and thus lowers the possibility of air entering the axle housing and increasing the pressure in oil guiding areas.

Preferably, the rotatable air passage Is pressurised for a pre-determined amount of time prior to inflating and deflating the tyre. The method can thus be an automated process which can be controlled by a vehicle control unit when initiated by a driver.

Preferably, an air supply line connects the rotatable air passage to the tyre and wherein the air supply line is blocked to facilitate pressurisation thereof.

Alternatively or additionally, the air supply line may be provided with a pressure sensor and the rotatable air passage is pressurised until a pre-determined pressure is reached. The integrity of the sealing means between the rotatable and non rotatable passages can thus be ensured by either pressurising the rotatable passage until a pre-determined pressure is reached, or pressurising the rotatable passage for a pre-determined period of time.

Preferably, the rotatable air passage is connected to the pressurised air supply by a first valve means and connected to the tyre via a second valve means, said first valve means mounted on the non rotatable part and said second valve means located in the air supply line and when the need for pressurisation is detected, the second valve means is closed and the first valve means is adjusted to pressurise the rotatable air passage.

When the pre-determined pressure is reached, the second valve means may be opened to is pressurise or de-pressurise the tyre.

When the pre-determined pressure is not reached, the inflation and deflation may be aborted and a warning given to the driver.

Preferably, the first valve means is a stop valve or a pilot valve.

The second valve means may be electronically or pneumatically controlled.

Preferably, a vehicle control unit identifies the need to pressurise the rotatable air passage and controls the operation of the first and second valve according to the method.

Preferably, the sealing means when in contact with the contact component provides a through passage with the rotatable air passage so that when the rotatable air passage is pressurised the through passage is also pressurised and ensures the integrity of the sealing means with the contact component.

BRIEF DESCRIPTION OF THE DRAWINGS

The invention will now be described, by way of example only, with reference to the drawings, FIGS. 1 to 5, in which.

DETAILED DESCRIPTION OF THE INVENTION

Figure 1:
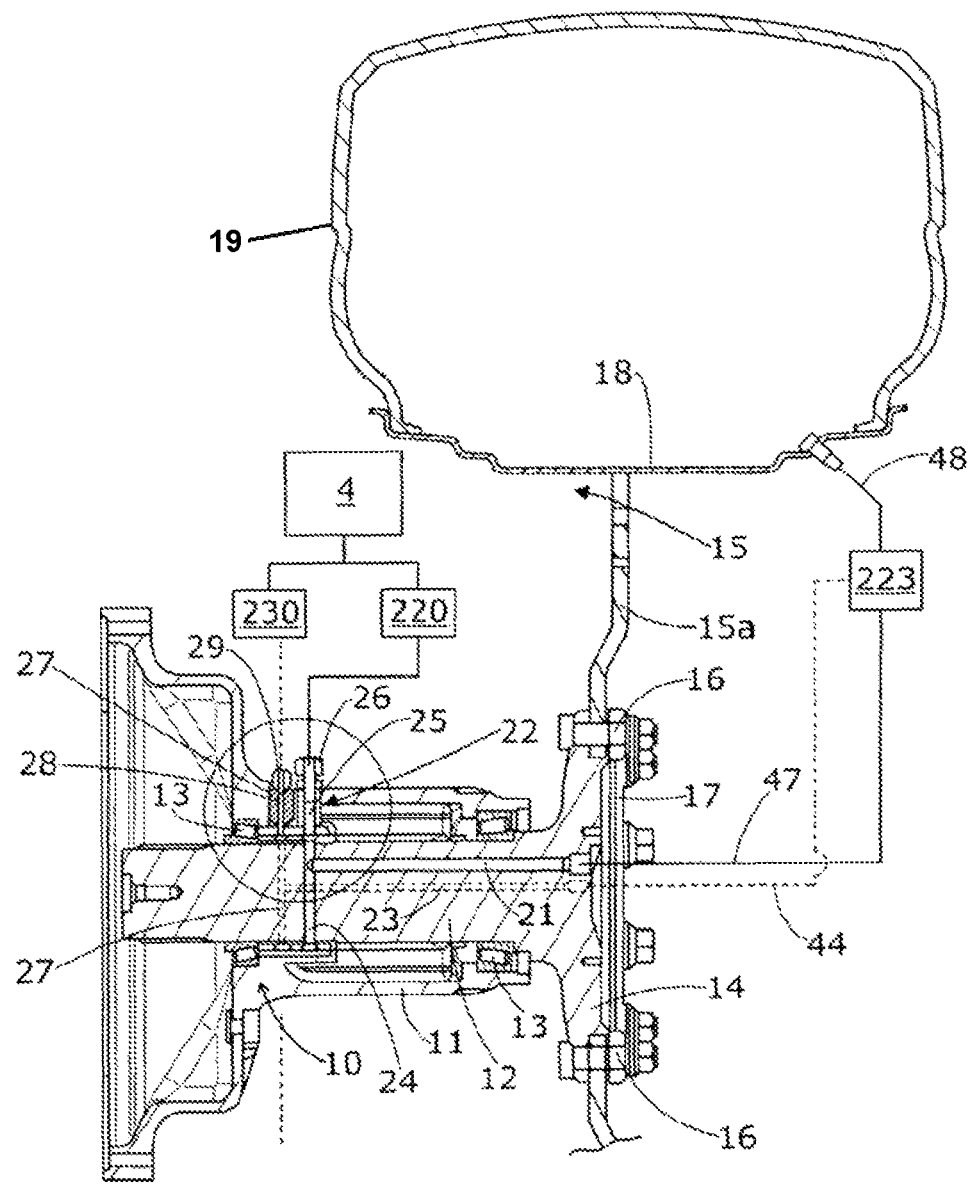
FIG. 1 is an axial sectional view through half of a tractor rear axle fitted with a tyre inflation feed arrangement in accordance with the invention.
Figure 2:
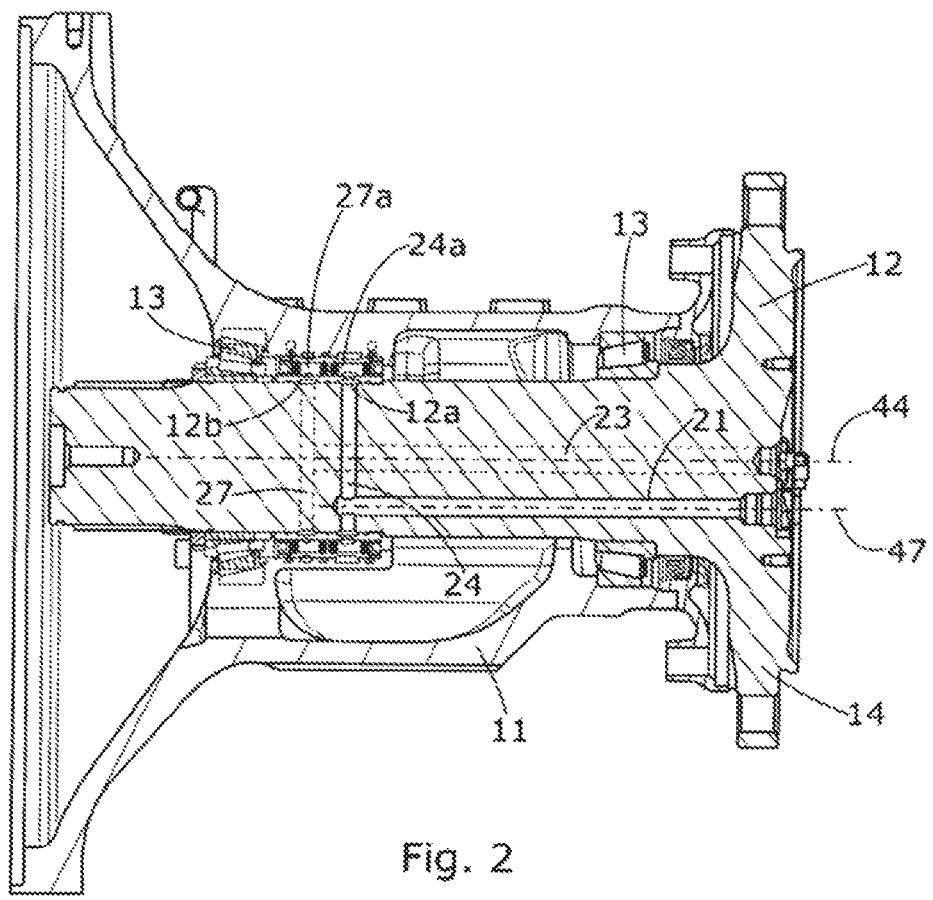
FIG. 2 is a section through the rear axle of FIG. 1 on a larger scale.
Figure 3:
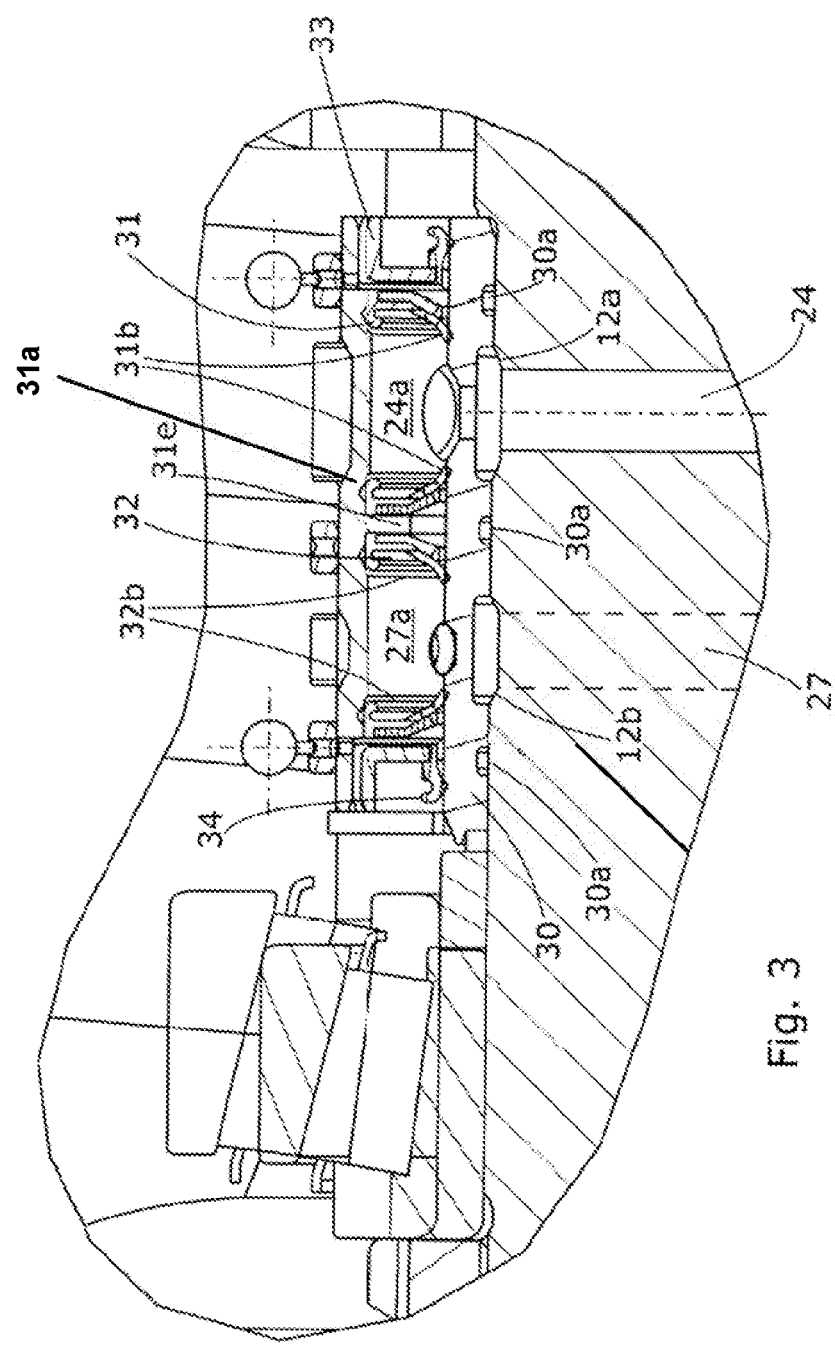
FIG. 3 is part of FIG. 2 on a larger scale.

Referring to FIGS. 1 to 3, a tractor rear axle 10, half of which is shown in cross-section in FIGS. 1 and 2 has an outer trumpet housing 11 within which a shaft 12 is supported by bearings 13. Shaft 12 terminates in a flange 14 to which a wheel disc 15a of a wheel 15 is clamped by bolts 16 and a clamping ring 17.

The wheel disc 15a carries a wheel rim 18 on which a pneumatic tyre 19 is mounted. The present invention is concerned with a tyre inflation system for conveying compressed air from a tractor air supply system 4, or for conveying air from the atmosphere to a tyre 19. The air is conveyed via air control valves 221 mounted on the tractor through a rotatable passage 240, along line 47, through valve 223 and through line 48 to the tyre 19. Air supply system 4 provides compressed air for control circuit 230 and supply circuit 220 which are explained in greater detail in FIGS. 4 and 5.

The tyre inflation teed arrangement 22 which is shown in greater detail in FIG. 2 is provided with two rotatable air passages 240. One rotatable passage 240 comprises a first passage 21 and a first radial feed passage 24. The other rotatable air passage 240 comprises a second passage 23 and a second radial feed passage 27. Each rotatable air passage 240 extends within the shaft 12 from flange 14 to a first and second annular axle zone 12a, 12b on the outer periphery of shaft 12 respectively. At the hub end of the shaft, outside of the hub, shaft and shaft housing, first passage 21 connects the rotatable air passage 240 with air supply line 47. Second passage 23 is likewise connected to valve 223 by air supply line 44 outside of the hub, shaft and shaft housing. First radial feed passage 24 extends from first annular zone 12a to first passage 21. First and second radial feed passages 24, 27 are perpendicularly connected to respective first and second passages 21, 23 which extend inside the enclosed shaft to flange 14. In this way, both the rotatable air passages 240 are fully enclosed within the rotatable shaft 12 and trumpet housing 11.

A contact component 30 surrounds annular zones 12a and 12b and is sealed to shaft 12 by seals 30a. Contact component 30 is formed from, or coated with a plastics material such as PTFE, or could be made from stainless steel, or could be hardened by nitrogen to be wear resistance. Radial passages 24 and 27 emerge through contact component 30 forming first feed through chamber 24a and second feed through chamber 27a. A holding element in the form of a surrounding casing 31a provided with sealing means 31, 32 is attached to the axle housing, or non rotatable part. The sealing means 31, 32 comprises a pair of seals 31b, 32b which when in contact with the contact component 30 provides a through passage with the air passage so that when the rotatable air passage 240 is pressurised, the through passage is also pressurised and ensures the integrity of the seal 31b, 32b with the contact component 30. The pair of seals 31b and 32b come into contact with the contact means 30 on the shaft 12 around annular zones 12a, 12b. Pipes 25 and 28 extend from the exterior of the axle housing, or non rotatable part of the vehicle through the axle housing to the casing 31a. They may be screwed to the casing 31a. With this arrangement there is a free, open passage which extends from the surface of the axle housing, through pipes 25, 28, through the radial zones 12a, 12b and through the rotatable air passage 240 to the flange 14. At the exterior of the axle housing, pipes 25 and 28 are provided with pipe fittings 26, 29 which are connected by respective lines to supply circuit 220 and control circuit 230. Pipes 25, 28 may be made from stainless steel, or, brass, or some other non corroding material. Pipes 25, 28 and pipe fittings 26, 29 and respective seals which provide air-tight connections are not shown in FIG. 3 for clarity reasons as they are not relevant for the invention.

Sealing means 31 is mounted in a casing 31a into which pipe 25 is screwed. Sealing means 31 which comprises a pair of seals 31b on either side of first feed through chamber 24a are forced into sealing contact with the contact component 30 when first feed through chamber 24a is pressurised and thus seals the flow of air to passages 21, 24. A shaft seal 33 is also provided in casing 31a to prevent the ingress of oil and dirt around shaft 12.

Second sealing means 32 is also mounted in casing 31a into which pipe 28 is screwed. Sealing means 32 includes a pair of seals 32b which are provided on either side of second feed through chamber 27a so that when second feed through chamber 27a is pressurised, seals 32b are forced into sealing contact with the contact component 30 to seal the flow of air through passages 23, 27. A shaft seal 34 is also provided in casing 31a to prevent the ingress of oil and dirt around shaft 12.

The two sealing means 31 and 32 are located side by side with shaft seals 33 and 34 axially outermost relative to the two annular axle zones 12a and 12b. A spacer 31e is built into casing 31a between the sealing means.

Use of a separate contact component 30 allows relatively easy replacement of the contact member if it becomes worn due to the contact pressure of sealing means 31 and 32 without the need for replacement of the expensive flange 14 and associated shaft 12.

Although in the embodiment described the seals 31 and 32 are carried by housing 11 and the contact member 30 is mounted on shaft 12, this arrangement could be reversed if desired. Furthermore, any other sealing means in which the sealing contact Is provided by pressurising the respective passage could be used instead of the embodiment shown in FIGS. 1 to 3. Additionally, the radial passage as could be replaced by an axial feed through arrangement as shown in the applicant's patent applications GB1016661.9 or GB1016662.7.

Figure 4:
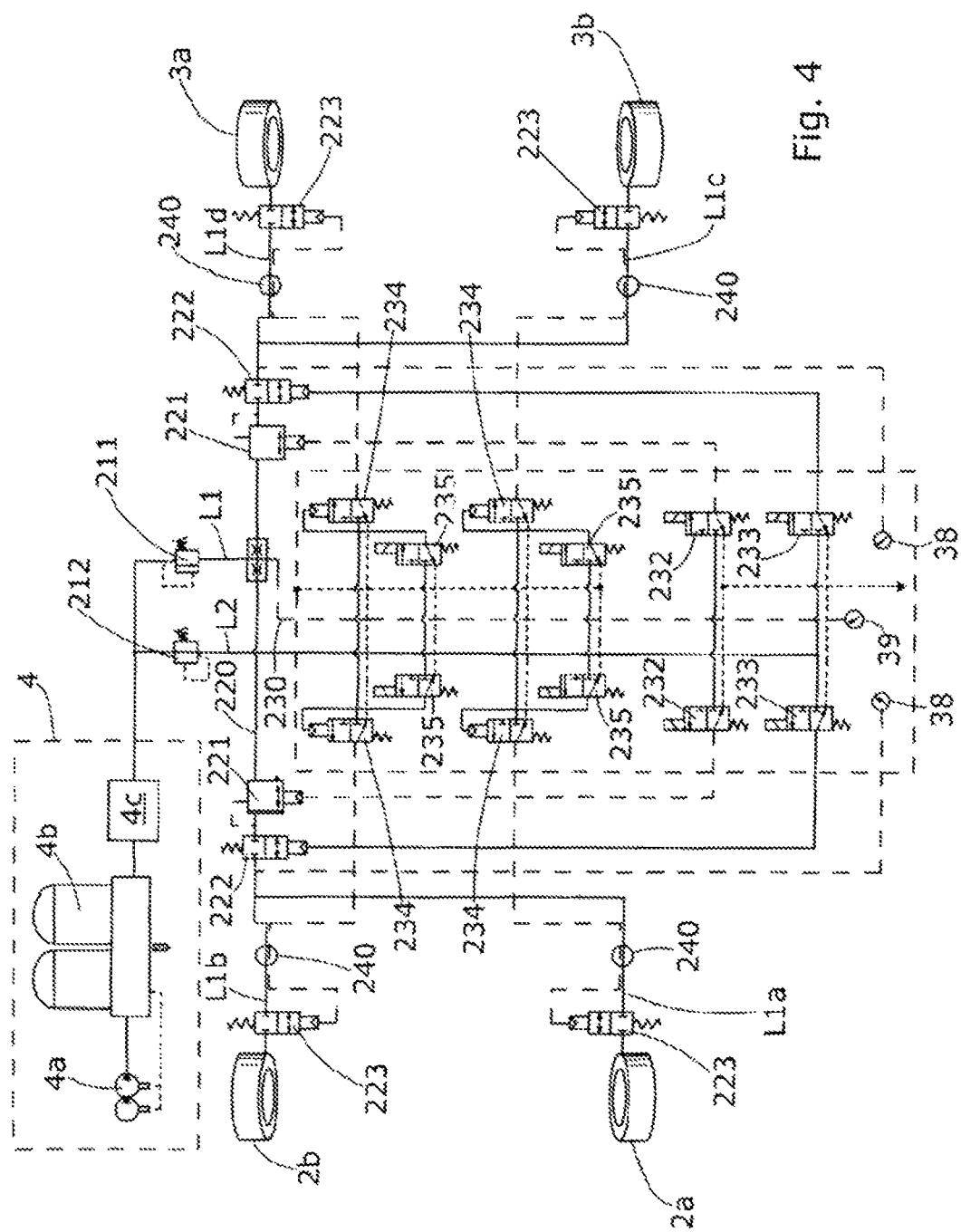
FIG. 4 shows a pneumatic circuit diagram of the tyre pressure control system (TPCS) in accordance with the present invention.

FIG. 4 shows the supply and control circuits 220 and 230 respectively on a tractor 1. The tractor 1 is provided with: left and right front tyres 2a, 2b, left and right rear tyres 3a, 3b,
a tyre pressure control system (TPCS) and a tractor air supply system 4 comprising a compressor 4a, air drier 4b, a protection valve means 4c.

The tractor air supply system 4 has a compressor 4a which supplies consumers via an air drier 4b. The air drier 4b includes a reservoir to store compressed air and a granule cartridge to extract water from the air. A pressure limiting valve restricts pressure levels to a maximum of approximately 8.5 bar. Typical consumers are, for example, the tractor braking system, the trailer braking system, or a front suspension (not shown). These consumers are primary consumers as their function is relevant for safety. A secondary consumer is the TPCS. A protection valve means 4c balances the pressure required to be supplied to the primary set of consumers and will cut the supply to any consumer should a consumer develop a leak. In this way, the integrity of the remaining primary consumers is maintained. Furthermore, protection valve means 4c ensures that supply to primary consumers is prioritised over the supply to secondary consumers, such as the TPCS.

The tractor air supply system 4 solely serves the purpose to supply air to the TPCS at a specific pressure level, for example 8 bar and at a sufficient air flow to ensure acceptable inflation time during operation. The term air flow is taken herein to mean the volume of air per unit time. The tractor air supply system 4 could be replaced by any other air supply system, for example, a system such as that described in the Applicant's published patent application WO011/001261, or EP2 340 974 which serves the same purpose and has a compressor in addition to an internal compressor.

The tractor air supply system 4 is connected to the TPCS via an excess flow valve 211 which is set to a minimum pressure level of, for example, between 7.1 to 7.5 bar. If the pressure level in the line L1 drops below the set level, for example, if a break in the line occurs, the connection is blocked to protect the tractor air supply system 4 from complete air discharge.

A second connection between the air supply system 4 and TPCS is further provided via a pressure relief valve 212 which limits the pressure in line L2 to a level between 4.5 to 5 bar. The need for this second pressure level is explained later on.

Generally, the TPCS comprises two separate circuits which represent two functions of the system.

Figure 5:
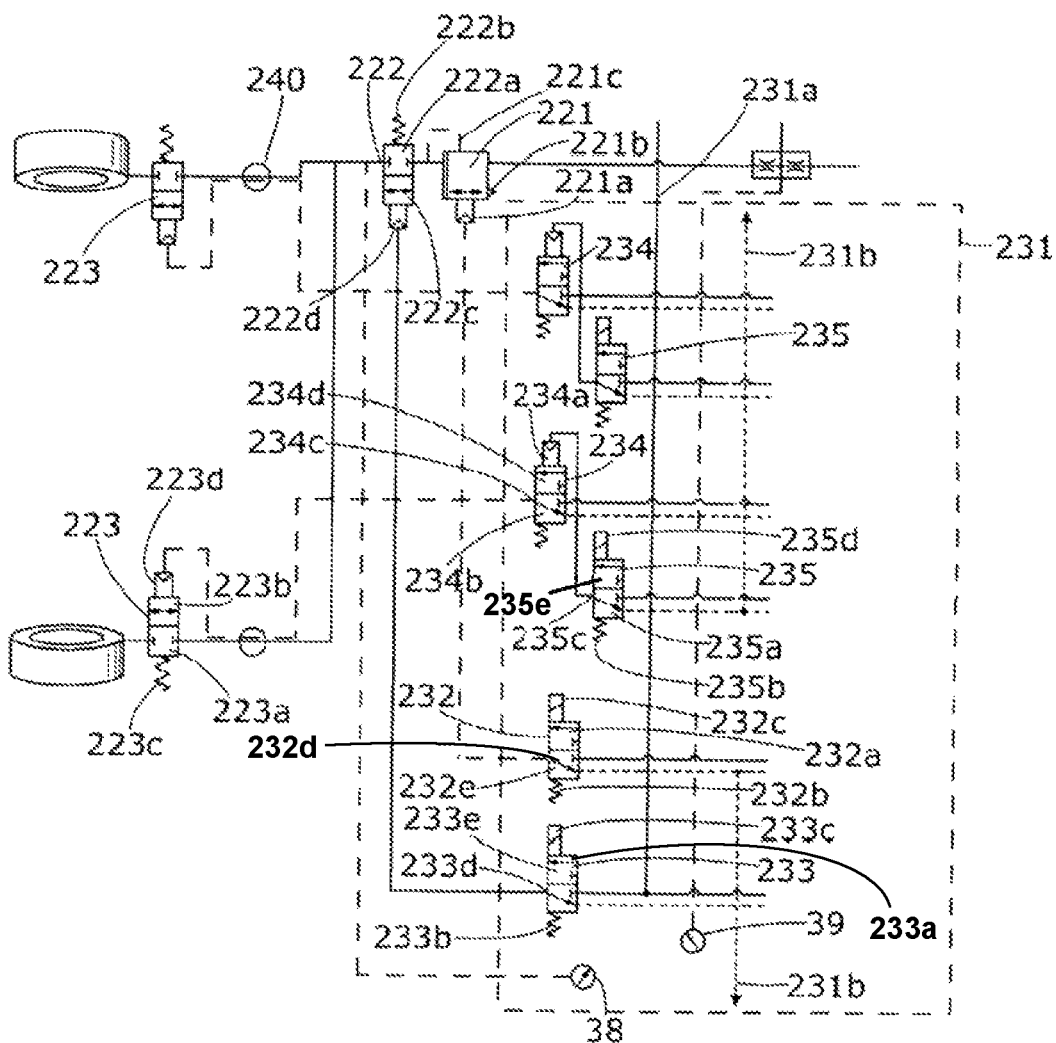
FIG. 5 shows the pneumatic circuit diagram of FIG. 4 in further detail.

One circuit is the supply circuit 220 which is depicted in FIGS. 4 and 5 with continuous lines and which provides an air supply to the tyre. This circuit must be capable of high air flows at a maximum pressure level to ensure fast inflation of a tyre.

A second circuit, control circuit 230 which is shown by the broken lines in FIGS. 4 and 5 is provided for activating the deflation and inflation process by components controlled by the pilot valve of the supply circuit 220. The pressure level is reduced by pressure relief valve 212. All components of the control circuit 230 are specified for lower air flows compared to the supply circuit 220 as the pilot function only requires a low air flow. The lower pressure level and air flow in control circuit 230 enables the use of smaller and cheaper components, especially valves, which improves procurement, costs and installation space. Furthermore, the lower pressure level enables higher accuracy when sensors are installed, as the accuracy is decreased with a greater range of operation.

The TPCS is similar for the front and rear axle (and mostly the same for each tyre).

FIG. 5 shows FIG. 4 in greater detail in which the components related to rear tyres 3a, 3b and to the tractor air supply system 4 have been omitted.

The supply circuit 220 is provided with two main control valves 221 (one assigned to front tyres 2a, 2b and the other assigned to rear tyres 3a, 3b) to regulate the pressures in the tyres. The main control valves have two different operating conditions and may be controlled pneumatically, or electronically. In a first condition, for tyre inflation, the supply lines (that is the air supply lines connected to line L1) are connected. In a second condition, the supply lines are connected to ambient atmosphere (for deflation). Tyre supply lines L1a, L1b, L1c and L1d, connect the first stop valves 222 to each tyre. Each of the first stop valves 222 Is connectable to supply line L1 for inflation and to the atmosphere tor deflation.

Each tyre is connected to first stop valve 222 via a second stop valve 223 associated with each tyre. The tyres 2a, 2b on the front axle are connected to one first stop valve 222 and the tyres 3a, 3b of the rear axle are connected to another first stop valve 222. Each first stop valve 222 connects the main control valve 221 to a second stop valve 223 on each tyre. The first stop valve 222 is biased by a spring means 222b and can be moved into a position 222a to close the valve (as shown in FIG. 5) and block air flow, or can be moved into an open position 222c to allow air flow. The valves 222 may be moved into the open position 222c against the force of spring 222b pneumatically by charging port 222d.

Air passing from the air supply 4 will pass through main control valve 221 and then flow through first stop valve 222. From first stop valve 222, the supply lines branch off to the respective tyres 2a, 2b and 3a, 3b. Through the supply line in each branch air will pass through first radial feed passage 24 and passage 21 (being part of the rotatable passage 240) for inflating and deflating a tyre as shown in FIGS. 1 and 2.

Second stop valves 223 are also controlled pneumatically and can be moved into two positions, open and closed. A closed position 223a is shown in FIGS. 4 and 5 in which valve 223 is biased by spring 223c to block the air flow to and from the tyre. By charging port 223d, the valve 223 can be moved against the spring 223c into an open position 223b to connect the interior of the tyres 2a, 2b, 3a, 3b to the supply line. A pilot valve manifold 231 (described later on) comprises two pressure sensors 38, 39. First pressure sensors 38 are provided in the supply line between first stop valve 222 and second stop valve 223. Second pressure sensor 39 is connected in the supply line before first stop valve 222 and main control valve 221 of each axle.

During operation of the tractor and when the TPCS is in stand-by mode, second stop valves 223 are in a closed position 223a to close the tyre volume.

The term operation of the vehicle, or machine is defined herein as meaning that the vehicle, or machine is in a condition in which its system or systems are sufficiently powered to automatically inflate or deflate a tyre, or detect a change in pressure of a tyre. The term shut down of the vehicle is defined herein as meaning a condition in which the vehicle, or machine is in a condition that its system or systems are not sufficiently powered to automatically inflate or deflate a tyre, or detect the pressure of a tyre.

Referring to TPCS, the term stand-by mode is defined herein as meaning that the TPCS is in a condition wherein no change in tyre adjustment is being made by the driver, or an automatic control system but measurements, or monitoring functions may still be performed. The TPCS active mode is a condition in which the tyre pressure is being adjusted.

If the vehicle is not in operation (that is, it is shut down), TPCS is also not in operation since supply of any electric, or pneumatic energy supply is cut. Consequently, in this condition, the TPCS is not in stand-by or in active mode.

It the tyre pressure is adjusted (either through manual input by the driver or an automatic control system), second stop valve 223 and first stop valve 222 are opened.

First stop valve 222 closes the connection between the main control valve 221 and second control valve 223 and thus provide a safeguard from any leakages from the tyre through second control valve 223 which may not be working correctly owing to trapped debris and particles. Valve 222 also protects against any leakage through main control valve 221.

When the vehicle is shut down, first stop valve 222 and second stop valve 223 are closed securely and prevent any leakages, After any deflation, or inflation process which results in second stop valve 223 being in a closed position 223a, the first stop valves 222 are brought into an open position 222c and a main control valve is moved to an ambient connection (that is the atmosphere) so that pressure is discharged from the supply line. The discharge ensures that the rotary passage is free of pressure and the air seals are not in contact. To detect whether there has been a leakage during shut down, first stop valve 222 is then closed again (position 222a). Pressure sensors 38 monitor the pressure in the supply line between the first stop valve 222 and main control valve 221 during shutdown and if the pressure exceeds atmospheric pressure, a warning signal is generated since any rise in pressure would be the result of a leakage through second stop valves 223. The driver is made aware of the warning signal when the vehicle is put into operation again.

Alternatively, just prior to shut down, when pressure through pressure sensors 38 can be recorded, the pressure values are stored in the tractor control unit. When the vehicle is in operation, the pressure in the supply line is measured again and compared with the recorded value. If the two values are not the same, a warning signal is generated and the driver made aware.

To inflate a tyre, main control valve 221 is adjusted so that the tyre is connected to the tractor air supply system 4 and the tyre is charged with air. The pressure adjustment may be done in two ways. One way is that main control valve 221 Is fully opened until the tyre pressure (monitored by first pressure sensor 38) reaches the desired value. In a second way, main control valves 221 may be opened to a position corresponding to the desired pressure. The tyre pressure is fed back via line 221c and main control valve 221 closes when the value is reached. In case of deflation, main control valve 221 is moved into a positron in which port 221b is connected with the atmosphere. Air can be discharged to the atmosphere until the desired pressure value which is monitored by first pressure sensor 38 is reached.

Furthermore, the feedback via line 221c ensures that the pressure level in the supply circuit after the main control valve 221 does not exceed a predetermined value, for example, 4.5 to 5 bar as the pressure in line 221c counteracts against the pressure coming from pilot circuit via port 221a which is set to a maximum of 4.5 to 5 bar. This balancing ensures that the tyres are not charged with more than 5 bar which represents an acceptable level.

The supply circuit 220 of the TPCS is thus provided with two different pressure levels:

In between supply system 4 and main control valve 221, the pressure level, hereinafter referred to as the tractor supply pressure, can reach 8.5 bar. In between main control valve 221 and tyre 2a, 2b, 3a, 3c, the pressure level is limited to 5 bar hereinafter referred to as the TPCS supply pressure.

As described above, the valves 221, 222 and 223 are controlled pneumatically. The control function is provided by control circuit 230. All means for controlling the valves are integrated in a pilot valve manifold 231 as shown by the dotted lines. Pilot valve manifold 231 is connected via port 231a to pressure relief valve 212 to receive air at a reduced pressure level of between 4.5 to 5 bar. Ports 231b enable the discharge of air to the atmosphere. Each valve installed within pilot valve manifold 231 is connected to the respective ports to supply air or to discharge air to the atmosphere. Pilot valve manifold 231 is also connected to the tractor control unit (not shown) to control the TPCS. Alternatively, pilot valve manifold 231 may be equipped with its own control unit for receiving required parameters from the tractor control unit.

Main control valves 221 are pilot controlled by first pilot control valves 232 which are designed as a three port/two way valve. Valves 232 move into position 232a against spring 232b when solenoid 232c is activated. When port 232d is charged with air, port 221a is also charged with air so that main control valve 221 is opened. The valve is biased into the second position 232e shown in the drawings by spring 232b and port 232d is connected to the atmosphere so that main control valve 221 is moved to a position in which port 221b is connected with the atmosphere (tor deflation).

In a mid position, main control valve 221 blocks the connection. The mid position is provided if the pressure charged via line 221c is balanced with the pressure charged via port 221. Due to the simple and cheap design of the valve, this mid position cannot be adjusted permanently, so that valve 221 cannot be used to control blocking of the connection.

Stop valves 222 are pilot controlled by second pilot control valve 233. Depending on its position, the stop valves 222 are opened or closed. The position 233a of second pilot control valve 233 shown in FIGS. 4 and 5 is biased by spring 233b. If solenoid 233c is activated, port 233d and thereby port 222d is charged with air so that stop valves 222 are opened to position 222c. In the second position 233e, port 233d and thereby port 222d are connected to the atmosphere and stop valves 222 are moved into position 222a by spring 222b so that air flow through stop valves 222 is blocked.

As second stop valves 223 are installed on the tyres, the connecting pipes to the pilot valve manifold 231 are much longer compared to the connection of main control valves 221 and first stop valves 222. The overall resistance due to the rotatable passages 240 and longer lines result in the requirement of further third pilot control valves 234 which conduct a high air flow. This high air flow increases the pressure peak through the rotatable passage as the second stop valve blocks the air flow (when in position 223a) so that the back pressure increases the pressure level in the feed through passage. As valves with the required higher air flow capacity are not available with solenoid control, or are very expensive and spacious, third pilot control valves 234 are also pneumatically pilot controlled and connected to a fourth pilot control valve 235 which is similar (referring to air flow capacity) to first pilot control valve 232 and second pilot control valve 233. Fourth pilot control valves 235 is again solenoid-controlled. Thereby third pilot control valves 234 and fourth pilot control valves 235 provide a two-stage pilot control for second stop valves 223 working as fallowing:

Fourth pilot control valves 235 is kept in position 235a by spring 235b so that port 235c is connected to ambient pressure. As port 235c is connected to port 234a, third pilot control valves 234 is kept in position 234b. In this position, port 234c is connected to ambient pressure so that second stop valves 223 remain in blocked position 223a. If solenoid 235d moves fourth pilot control valves 235 in position 235e, port 234a is charged with air moving third pilot control valves 234 into open position 234d. In this position, port 234c is connected to air source so that second stop valves 223 is moved to open position 223b. Third pilot control valves 234 and fourth pilot control valves 235 are provided for each tyre.

The details relating to the pilot control within the pilot valve manifold 231 in general are not relevant for the invention and may be designed in various layouts. Solenoid controlled valves replacing valves 221, 222 and 223 may obviate the need for any pilot control.

Pilot valve manifold 231 comprises two pressure sensors 38, 39. First pressure sensors 38 are connected in the supply line after first stop valves 222 and second stop valves 223. Second pressure sensor 39 is connected in the line before first stop valves 222 and main control valves 221 of each axle. The function of both sensors is explained later on.

During operation of the tractor and when the TPCS is in stand-by mode, second stop valves 223 are in closed position 223a to close the tyre volume.

At the end of any inflation or deflation process, second stop valves 223 are moved to a closed position 223a.

During inflation or deflation the rotatable air passage 240 and through passages are charged with a high air flow, but a low pressure level. This is because the maximum tyre pressure of a standard tractor tyre is about 2 to 3 bar but the pressure of the air supply may be around 4.5 bar. As a consequence, the seals 31b, 32b are pressed into sealing contact under a low pressure. This pressure level can be varied depending on the tyre pressure target value, or the required air flow (which can be very low under certain conditions, for example, if only a small pressure difference Is necessary). It is difficult to design a seal which can be pressed sufficiently hard to make good contact with the contact component 30 without being easily worn when used for every operating condition. This affects the function of the seals 31b, 32b in the rotatable passage 240.

In accordance with the invention to ensure a suitable pressure level in the rotatable passage 240 before inflation or deflation of tyres, the pressure level in the rotatable passage 240 is raised by the following method:

1. Tractor control unit recognise the need of pressure adjustment and the process is initiated.
2. Second stop valves 223 are kept in closed position 223a.
3. Main control valves 221 are adjusted so that tyre is connected to the tractor air supply system 4 and the pressure level within the rotatable passage 240 and/or first feed through chamber 24a is raised. This step may be time controlled (by assuming that after a pre-determined time, the desired pressure level is reached), or by using pressure sensors 38. Pressurisation continues either until the pre-determined time is reached, or the desired pressure level is reached. At this stage, sealing means 31, 32 are firmly pressed against contact component 30 providing a good seal between the rotatable and nonrotatable parts. This step is provided both for inflation and deflation of the tyres.
4. If the pressure level in the rotatable passage 240 is within the defined pressure range, second stop valves 223 are moved to the open position 223b.

Main control valve 221 is then adjusted to obtain the desired tyre pressure as described above. The closure of stop valve 223 prior to any pressure adjustment ensures that there is a high pressure level between the seals 31b, 32b and therefore a proper sealing contact. After opening stop valve 223 for starting inflation or deflation, the pressure level may fall but the sealing contact is still sufficient due to the previous closure of valve 223. This method can be used prior to both inflation and deflation of the tyre without changing any structural components, or steps of the method. For the rotatable passage of the control line 44, this function is not required as the control line 44 is pressurised to move stop valves 223 to position 223b resulting in the air flow being initially blocked in line 44 so that the pressure level in the rotatable passage increases rapidly.

The method which can be used prior to both inflation and deflation of the tyre ensures that the rotatable passage 240 and through passage between sealing means 31, 32 is pressurised which therefore ensures the integrity of the seals 31b, 32b with the contact component 30. This thus provides a good seal between the rotatable and non rotatable parts of the arrangement before the pressure in the tyre is adjusted.

When pressure sensors 38 are provided, the deflation or inflation process is only activated when the pressure in the rotatable passage 240 Is within the defined pressure range. If the pressure level is not maintained, the system may generate a warning for the driver. This ensures that a malfunction is detected which increases the functional safety and efficiency of the vehicle or machine.

In an alternative embodiment at the arrangement, the stop valves 223 are replaced by lockable check valves. These lockable check valves are known in prior art and work as explained below:

The check valve is spring biased and connected to the control circuit 230 for pilot control. Generally a check valve comprises a piston-like closure member in form of a cone or ball which is biased by a spring. The piston is moved directly by the supply circuit 220, A further piston is charged by control circuit 230 (also called the pilot control). This additional piston acts on the closure member is mainly provided to offer a ratio (to enable low pilot pressure) or to avoid influence of both circuits.

The check valve normally blocks the flow of air from the tyre 2a, 2b, 3a, 3b back to the supply circuit 220 to prevent any unmeant deflation. During inflation, the supply circuit 220 provides a higher pressure (compared to the tyre) so that the check valve is opened against spring. The tyre can be charged with air to reach the desired tyre pressure. For deflation, the control circuit 230 pneumatically opens the check valve against the spring so that air can be discharged from the tyre. In this case the spring is designed to be opened solely by the pressure in the supply circuit 220.

In accordance with the alternative arrangement, the design of known check valves is adapted in that the spring is designed so that the check valve cannot be opened by pressure supplied in the supply circuit 220 but only by a pre-determined pressure in the control circuit 230. Referring to the design, the effective surface of the pistons is specified in that the size on the supply circuit 220 is small compared to the size on the control circuit 230 so that the check valve can only be opened (in one direction) by a pre-determined pressure in the control circuit but not by the operating pressure in the supply circuit.

Prior to any inflation or deflation, the check valve is kept in a locked position while the supply line is charged to a pre-determined pressure level without being able to open the connection to the tyre.

In the embodiment shown in FIGS. 1 to 5, the invention is realised by installing main control valves 221 and second stop valves 222 in series due to reasons described above. It is envisaged that the invention could also be realised by combining the function of both valves 221, 222 into one valve, either 221 or 222.

In the embodiment shown in FIGS. 1 to 5 the rotatable air passage 240 pneumatically connects the non rotatable trumpet housing 11 and the rotating shaft 12. It is envisaged that any other rotatable air passage of a non rotatable part of the vehicle, or a rotating component connected with the tyre falls within the scope of the invention. The rotatable passage may, for example be provided on the outside of the tyre and be connected to the air supply via pipes, or hoses.

The invention claimed is:

1. A method of inflating and deflating a tyre on a vehicle, said vehicle having a rotatable air passage connectable to a tyre, said vehicle having a non rotatable air passage through which air is conducted from a pressurised air supply, one of the passages having sealing means for connecting with a contact component of the other passage and wherein prior to inflation and deflation of the tyre, one of the passages is pressurised to ensure the integrity of the sealing means with the contact component.

2. The method of inflating and deflating a tyre as claimed in claim 1 wherein the rotatable air passage is pressurised for a pre-determined amount of time prior to inflating and deflating the tyre.

3. The method of inflating and deflating a tyre as claimed in claim 2 wherein an air supply line connects the rotatable air passage to the tyre and wherein the air supply line is blocked to facilitate pressurisation thereof.

4. The method of inflating and deflating a tyre as claimed in claim 3 wherein the air supply line is provided with a pressure sensor and the rotatable air passage is pressurised until a pre-determined pressure is reached.

5. The method of inflating and deflating a tyre as claimed in claim 3 wherein the rotatable air passage is connected to a pressurised air supply by a first valve means and connected to the tyre via a second valve means, said first valve means mounted on the non rotatable part and said second valve means located in the air supply line and when the need for pressurisation is detected, the second valve means is closed and the first valve means is adjusted to pressurise the rotatable air passage.

6. The method of inflating and deflating a tyre as claimed in claim 5 wherein when the pre-determined pressure is reached, the second valve means is opened and the tyre is pressurised or de-pressurised.

7. The method of inflating and deflating a tyre as claimed in claim 6 wherein when the pre-determined pressure is not reached, the inflation and deflation is aborted and a warning to the driver is given.

8. The method of inflating and deflating a tyre as claimed in claim 5 wherein the first valve means is a stop valve or a pilot valve.

9. The method of inflating and deflating a tyre as claimed in claim 5 wherein the second valve means is electronically or pneumatically controlled.

10. The method as claimed in claim 5 wherein a vehicle control unit identifies the need to pressurise the rotatable air passage and controls the operation of the first and second valves.

11. The method of inflating and deflating a tyre on a vehicle as claimed in claim 1 wherein the sealing means when in contact with the contact component provide a through passage with the rotatable air passage so that when the rotatable air passage is pressurised the through passage is also pressurised and ensures the integrity of the sealing means with the contact component.

12. The method of inflating and deflating a tyre as claimed in claim 1 where the rotatable passage is located within an axle shaft.

* * * * *